United States Patent Office 2,890,185
Patented June 9, 1959

2,890,185

MODIFIED ALKYD RESIN REACTED WITH A VINYL AROMATIC COMPOUND, A VINYL CYANIDE AND AN ACRYLATE

James H. Sample, Chicago, and Charles H. Williams, Homewood, Ill., assignors to The Sherwin-Williams Company, Cleveland, Ohio, a corporation of Ohio No Drawing. Application June 6, 1956
Serial No. 589,572

16 Claims. (Cl. 260—22)

This invention relates to non-gelled resinous materials which are the reaction products of oil modified, or oil acid modified, alkyds further modified with at least three different monomers. More particularly, this invention relates to resinous materials comprising drying or semi-drying oil modified or drying or semi-drying oil acid modified alkyds further modified with monomeric polymerizable materials comprising a vinyl aromatic compound, e.g., vinyl toluene, a vinyl cyanide, e.g., acrylonitrile, and an acrylic ester, e.g., methyl methacrylate. This invention further relates to the processes of preparing these resinous compounds.

Automotive finishing and refinishing places heavy demands upon any coating composition to be used for these purposes. Up until the present time the art has had to compromise on certain properties in order to secure others. For example, if fast dry is formulated into the compound, there may be a sacrifice of stability toward climatic conditions. Thus under conditions of high temperature and high humidity, such fast dry materials may exhibit wrinkling.

It is a principal object of the present invention to provide a very fast drying vehicle with no tendency to wrinkle under conditions normally productive of wrinkling.

Another problem associated with prior coatings is overspray, i.e., atomized paint, unintentionally falling on previously coated panels or areas. It has been found with coatings formulated with the novel vehicles of this invention that overspray problems are easily avoided. Overspray unexpectedly disappears after a short time or is absorbed in a second pass of the gun. It is a further object, therefore, to provide a vehicle of improved overspray characteristics.

Today air drying and baking finishes require entirely different formulations, the closest approach to a universal finish appearing in compositions requiring only the addition of a catalyst or "converter" to a normally air drying formula. The compositions made with these novel vehicles do not require "converters." It is another object of this invention to provide a vehicle useful in air drying and baking formulas (which may be the same) requiring no converter to impart utility as baking enamels.

Other advantages obtained in the use of these vehicles include higher initial gloss, improved gloss retention, better flow, resistance to skinning in the package, improved odor, etc.

Other objects will appear as the description proceeds.

Broadly stated, this invention comprises as a new composition of matter, a non-gelled interpolymer, useful for coating compositions, of an oil-modified alkyd and at least three monomers; a monomeric monovinyl aromatic compound, a monomeric ester of an unsaturated aliphatic acid having the formula:

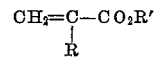

wherein R is selected from the group consisting of hydrogen and alkyl radicles of from 1 to 4 carbon atoms and R' is an alkyl radicle of from 1 to 8 carbon atoms and a monomeric vinyl cyanide. The amount of monomer composition by weight used to modify the alkyd ranges from about .5 to about 2 times the weight of the oil acid used, or the converted acid content of the oil used, in the alkyd. The monomers may be reacted as a ternary mixture, one followed by a mixture of the other two, a mixture of two followed by reaction with the third, or reacted singly and sequentially. Moreover, the oil portion of the alkyd may be treated with the monomers prior to alkyd formation. In a preferred embodiment, the oil-modified alkyd is reacted with a ternary mixture of the above-mentioned monomers.

THE ALKYD PORTION OF THE VEHICLE

As indicated above, the new resinous compounds of this invention are best produced by co-reacting a mixture of at least three polymerizable monomers and an alkyd resin. Ordinarily these alkyds are prepared prior to modification with the monomers, although conveniently there is no interruption of the cooking operation.

Alkyd resins of the type normally used in coating compositions are produced by the interaction of at least three materials; namely, a polybasic acid, a polyhydric alcohol, and a drying oil or semi-drying oil fatty acid or alcoholyzed drying or semi-drying oil. Other modifying agents may be present in the reaction mass such as, for example, monocarboxylic acids, e.g., benzoic acid, crotonic acid, etc. The alkyds may also be modified with rosin or phenolic resins, or other well known materials. Two principal techniques have been developed for the preparation of such modified alkyds, e.g., solvent method and fusion method. For the present purposes, the manner of producing the modified alkyd is relatively unimportant. Accordingly, where reference is made to a drying oil or semi-drying oil modified alkyds herein, alkyds are contemplated whether produced by (a) the direct esterification reaction of semi-drying oil fatty acids with the polycarboxylic acid and the polyhydric alcohol or (b) the indirect esterification wherein a drying oil or semi-drying oil is first alcoholyzed with a polyhydric alcohol and thereafter esterified with a polybasic acid, under either of the principal techniques mentioned.

It is, of course, understood that multiple components may be present in the reaction mass, and instead of one drying or semi-drying oil, a mixture of drying or semi-drying oils and/or fatty acids, one or more polybasic acids, and one or more polyols may be used. The reaction may be carried out in the presence or absence of catalysts and in the presence or absence of solvents.

The unsaturated aliphatic drying oil or semi-drying oil acids are preferably those derived from naturally occurring oils of animal, vegetable or marine origin, particularly those derived from drying oils and semi-drying oils. These acids may be either non-conjugated or conjugated and may be employed as the monomer, dimer and/or trimer. Such preferred acids have an iodine value of from about 120 to about 425. Specific examples of unsaturated aliphatic acids useful in accordance herewith for the production of oil-modified alkyd resins are as follows:

*Table I*

| Fatty Acid | Empirical Formula | Natural Source |
|---|---|---|
| Hiragonic | $C_{16}H_{26}O_2$ | Japanese Sardine Oil. |
| Linoleic | $C_{18}H_{32}O_2$ | Cottonseed Oil. Soyabean Oil. Peanut Oil. Corn Oil. Sunflower Seed. Poppy Seed. Linseed Oil. Perilla. Sesame. |
| Iso-linoleic | $C_{18}H_{32}O_2$ | Castor Oil (dehydrated). |
| Linolenic | $C_{18}H_{30}O_2$ | Castor Oil (dehydrated). Linseed. Perilla. Hempseed. |
| Elaeostearic | $C_{18}H_{30}O_2$ | Tung. |
| Punicic | $C_{18}H_{30}O_2$ | Pomegranate. |
| Paranaric | $C_{18}H_{28}O_2$ | Seed Fats. |
| Arachidonic | $C_{20}H_{32}O_2$ | Brain, liver, blood and depot fats. |
| Clupanodonic | $C_{22}H_{34}O_2$ | Marine animal oils, e.g., menhaden. |
| Scoliodonic | $C_{24}H_{38}O_2$ | Marine animal oils. |
| Nisinic | $C_{24}H_{36}O_2$ | Do. |
| Tariric | $C_{18}H_{32}O_2$ | Seed Fat. |
| Licanic | $C_{18}H_{28}O_3$ | Oiticica oil. |
| Abietic | $C_{20}H_{30}O_2$ | Rosin. Tall Oil. |

Natural oils of the drying or semi-drying types, as exemplified above, are generally mixtures of glycerides of two or more of the acids named together with other glycerides, e.g., glyceryl oleate, glyceryl stearate and miscellaneous ingredients, e.g., phosphatides. Procedures for producing mixed acids of such oils are well known, e.g., "splitting" and such commercial acids are a preferred starting material. Thus there may be employed dehydrated castor oil fatty acids; linseed oil fatty acids, soyabean oil fatty acids, tung oil fatty acids, rosin acids, tall oil acids, etc., the individual purified and segregated acids contained therein, or the fatty acids named above and synthesized by known methods. Also as indicated such acids may be isomerized, or converted to the dimer or trimer prior to use herein. Polyethenoid acids of the conjugated, non-conjugated, or mixed conjugated, non-conjugated types may be used. In the preparation of coating composition vehicles, the drying oil fatty acids, and particularly the vegetable drying oil fatty acids are preferred.

Another of the essential components of the alkyd resins used in this invention is a polyhydric alcohol. These are aliphatic polyhydroxy compounds containing two or more hydroxy radicles. Those which may be used in accordance with this invention include for example, ethylene glycol, diethylene glycol, propylene glycol, glycerine, trimethylolethane, trimethylolpropane, pentaerythritol, polypentaerythritol, pinacol, polyallyl alcohol, arabitol, xylitol sorbitol, mannitol, mixtures of these, etc. In the preferred cases, polyhydric alcohols containing three or more hydroxy radicles are employed.

Under certain circumstances it will be found desirable to use in conjunction with the polyol or mixture of polyols, a monohydric alcohol. Examples of such monohydric alcohols include hydroabietyl alcohol, soya fatty alcohols, etc.

The third essential component of the alkyds useful in this invention is a polybasic acid. Specific examples of polybasic acids and/or derivatives of polybasic acids useful alone or in admixture with another polybasic acid in accordance with this invention include the following: phthalic acid, phthalic anhydride, maleic acid, maleic anhydride, citric acid, tartaric acid, fumaric acid, isophthalic acid, terephthalic acid (preferably in admixture with another dibasic acid), adipic acid, sebacic acid, tetrahydrophthalic anhydride, tetrachlorophthalic anhydride.

The most commonly used dibasic acid is, of course, phthalic anhydride, alone or in admixture with one or more of the others listed above.

In accordance with well known production techniques, the alkyds useful in accordance with this invention are prepared having an oil length of from about 33% to about 85%. In general, acid values of the final alkyds are maintained at less than about 40. The excess of hydroxyl groups over the available carboxylic acid groups as calculated in the admixing of the ingredients may range up to 50% over that theoretically required to react with the carboxyl content of the reaction mass. It may seem difficult of reconciliation that these materials have an acid number and at the same time an excess of hydroxyl. This may be explained by the fact that esterification occurs during heating of these reactants at elevated temperatures and if heating is carried on too far, gellation ensues. The product becomes solid and useless. Therefore, the "cook" is discontinued usually prior to complete reaction of all the carboxyl groups with available hydroxyl groups. Thus the product has an acid value; at the same time it contains what may amount to an excess of hydroxyl.

In the examples given later in the specification, reference will be had to certain oil-modified alkyds in terms of the ingredients inter-reacted to produce them. It will be understood that customary alkyd formation techniques are employed and that the products have oil lengths, acid values and hydroxyl contents within the ranges above specified.

The alkyds hereof are of the usual types familiar to paint and varnish makers. For the purposes of this invention, alkyds produced by direct esterification from drying or semi-drying oil acids are the full equivalent of alcoholized oils of the drying or semi-drying types, natural or synthetic. Thus oils may be used instead of fatty acids, or mixtures of oils, or of acids, or of acids and oils.

Among the wide variety of oil modified or oil-acid modified alkyds useful in accordance herewith are the following:

*Table II*

(1) 52% linseed oil, pentaerythritol, phthalate
(2) 60% soya bean oil, pentaerythritol, phthalate
(3) 52% soya-tung, glyceryl phthalate-phenolic modified
(4) 39% linseed glyceryl phthalate alkyd
(5) 45% oil (1:1 linseed-oiticica) glyceryl phthalate alkyd
(6) 33% linseed glyceryl phthalate-rosin modified
(7) 35% soya glyceryl phthalate-modified with maleic rosin ester
(8) 72% linseed pentaerythritol isophthalate
(9) 80% linseed pentaerythritol isophthalate
(10) 70% dehydrated castor pentaerythritol phthalate
(11) 66% linseed pentaerythritol phthalate
(12) 52% oil (4:1 soya-dehydrated castor) pentaerythritol phthalate
(13) 52% linseed pentaerythritol phthalate-benzoate (7:1)
(14) 52% linseed pentaerythritol-trimethylolethane (1:1) phthalate
(15) 52% linseed trimethylolethane phthalate
(16) 75% linseed trimethylolethane terephthalate
(17) 40% soya trimethylolethane phthalate-fumarate (19:1)
(18) 45% soya glyceryl phthalate-maleate (19:1)
(19) 48% safflower glyceryl phthalate-fumarate-benzoate (8.5:1:0.5)
(20) 60% linoleic acid glyceryl phthalate
(21) 70% linolenic acid glyceryl phthalate The percentages expressed above and in subsequent references to alkyd resins refer to the percentage of oil calculated as the glyceride in the final product at 100% solids. It does not matter whether the modification is by reaction of the oil fatty acid or the oil itself through alcoholysis; the designation will be the same.

Many other alkyds are known and may be used for the further monomer modifications of this invention. These alkyds and their equivalents may also be used as diluents for the alkyds monomer modified as hereinafter described. The improved compatibility of the monomer modified alkyds with the above alkyds over a wide range is a principal advantage of these products.

MONOMER MODIFICATION OF ALKYDS

The alkyds above described either as solutions in suitable solvents, e.g., xylol or a petroleum naphtha, or as 100% solids varnishes are preferably modified with a monomer admixture composed of three polymerizable monomeric liquids; e.g., (a) at least one vinyl aromatic compound, (b) at least one acrylic compound, and (c) at least one vinyl cyanide.

The polymerizable unsaturated monomeric materials useful in the preparation of a monomer mixture are generally mono-olefinic compounds of relatively low molecular weight, e.g., less than 250. These materials are capable by themselves of undergoing polymerization, i.e., one molecule of the material combining with another molecule or molecules of the same material, the resulting polymer being characterized by a recurring structural unit as distinguished from an interpolymer wherein two or more different molecules interact to form high molecular weight materials of indefinite structure. Thus the term "polymerizable" as used herein is intended to mean the property of the individual monomeric materials to react with themselves under appropriate conditions to yield polymers characterized by recurring structural units. These unsaturated materials are generally characterized by the group $CH_2=C<$.

The theory of mechanism of reaction and the structure of the final product of the reactions herein disclosed are not known. It is believed, however, that the product is in the nature of an interpolymer in which the combination of monomers has been tied into the alkyd through the unsaturated portion of the oil. Quite probably a small portion of one, or a combination of the several monomers, may polymerize with itself, or with one or more other monomers. The acrylate esters may become an integral part of the polymer through an ester interchange reaction becoming esterified through a hydroxyl of the alkyd polymer. A higher proportion of hydroxyl content would seem to favor this type of reaction.

As indicated above, the monomer admixture contains as one of the essential ingredients a vinyl aromatic compound. Industrially important examples of the vinyl monomers contemplated for use in accordance with the invention include the following:

*Table III*

Vinyl monomers:
  Aromatic hydrocarbons—
    Styrene
    Alpha methyl styrene
    Para methyl styrene
    Ortho-methyl styrene
    Meta-methyl styrene
    Alpha, para dimethyl styrene
    Vinyl naphthalene
    Acenaphthalene
    Vinyl toluene (mixed o-, m-, p-methyl styrenes)
  Aromatic halides, e.g.—
    Para chlorostyrene
    Para fluorostyrene
    Para trichloromethyl styrene
    2,5-dichlorostyrene
  Miscellaneous vinyl monomers, e.g., para methoxy styrene Mixtures of the foregoing materials, for example, styrene and vinyl toluene may also be employed. In the preferred embodiments of this invention the vinyl aromatic hydrocarbons, e.g., styrene, vinyl toluene and vinyl naphthalene are employed.

The amount of the vinyl aromatic compound ranges between about 10% and 85% by weight of the total amount of monomers used. For most purposes, amounts within the range of 25% to 60% by weight have been found to be satisfactory. The vinyl aromatic compound seems to improve the rate of drying and aids the film in developing early hardness. Vinyl toluene in particular seems to aid solvent solubility, reducing the amount of strong solvents required.

The acrylates used in the monomer modification include the alkyl acrylates, e.g., methyl acrylate, ethyl acrylate, propyl acrylate, iso-propyl acrylate, butyl acrylate, octyl acrylate, etc., the alkyl methacrylates, e.g., methyl methacrylate, ethyl methacrylate, propyl methacrylate, iso-propyl methacrylate, butyl methacrylate, capryl methacrylate, 2-ethyl hexyl methacrylate, n-octyl methacrylate, etc.; the ethacrylates, e.g., methyl, ethyl, propyl, butyl, and other such low molecular weight alkyl ethacrylates. Because of availability, methyl methacrylate is most conveniently utilized. When the higher alcohol esters are used, e.g., the butyl to octyl alcohol acrylates or alkacrylates, a plasticizing effect is exerted on the film. Accordingly, the percentage is desirably held in the lower portion of the permissible range to maintain good dry rate, stability, viscosity, etc., as well as adequate flexibility. The percentage of acrylate ester of the total monomer used may vary from 10% to 85%, and is desirably in the range of 25% to 60% by weight.

Vinyl cyanides, useful as the third modifying monomer, will be recognized as acrylonitrile or a homologue thereof. Thus acrylonitrile and low molecular weight alkyl substituted acrylonitriles are useful. Examples include acrylonitrile, methacrylonitrile, ethylacrylonitrile, propylacrylonitrile, etc.; the alkyl substituent groups containing up to 5 carbon atoms. There may be used in the monomer modification up to 50% by weight of acrylonitrile although for most purposes amounts ranging between 5% and 15% by weight are quite satisfactory. The vinyl cyanide aids in imparting rapid hardness, film gloss, and improves the drying rate of the alkyd. If the proportions become high, i.e., above about 20%, stronger solvents should be used to maintain compatibility.

Interpolymerization of the monomers with the unsaturated component or components of the alkyd is conveniently effected with catalyst of the peroxide type, e.g., di-tertiary butyl peroxide, tertiary-butyl hydroperoxide, cumene hydroperoxide, benzoyl peroxide, acetyl peroxide, lauroyl peroxide, etc. and mixtures thereof. The amount of catalyst usually ranges from 0.05% to 5% of the weight of the reactants. "Redox" catalysts may also be used, e.g., a peroxide plus a reducing sugar, a peroxide plus an amine, a peroxide plus a metal salt, etc.

Typical examples of redox catalysts include cumene hydroperoxide plus dextrose (1:1); benzoyl peroxide plus ferric sulphate (1:1); cumene hydroperoxide plus propylene diamine (1:1). The catalyst or catalyst mixture is conveniently added to the monomer mixture. It is sometimes convenient to mix a part of the catalyst to a part of one or more of the monomers and add this to the alkyd before beginning the major part of addition of the monomers. The purpose of this procedure is to provide sufficient quantity of catalyst to initiate the reaction. The remaining catalyst replaces that already used as the addition progresses. Experience has shown that this procedure gives faster reactions enabling reduction of the monomer addition time from about 4 hours to about 3 hours. Higher conversion of the monomer is also obtained by using this procedure. Finally, the addition of catalyst in solution in one or a mixture of monomers is a safety measure since the technique reduces the danger of catalyst decomposition on contact with the hot walls of the reaction vessel.

The total amount of monomer used in the further modification of the alkyds above described ranges from about .5 to about 2 times the weight of the oil acid component used in the alkyd. Such oil acid component may be derived in the final alkyd from use in the manufacture thereof of either the oil acid or the oil itself. For most purposes a ratio of 1:1 to 1:1.5 is satisfactory.

Reference will be had herein to "ternary monomer modified alkyds" by which will be understood an alkyd modified with three types of monomer material independently of the time or manner of addition of the monomers.

METHOD OF MAKING THE RESINS

The alkyd is processed in the usual manner familiar to those skilled in the art. In the manufacture of the alkyd, cooking is continued until an acid value of 40 or less has been secured and desirably so that the cure rate is not less than 30 seconds. In general, the processing temperature for the alkyd may be from 360 to 450° F. Conventional inert gas blowing may be used in fusion processing and for this purpose carbon dioxide, nitrogen or helium may be used. If it is desired, the alkyd may be made by the solvent method. The monomers may be first reacted with the oil or fatty acid or mono glyceride and then the alkyd completed in the conventional manner. Ordinarily, however, the process is one of modifying a previously prepared alkyd.

The addition of monomers is generally made at temperatures of from about 240° to about 300° F. if the addition is to be completed in 2 to 5 hours. Higher temperatures may be used if a longer addition time is permitted and the hold time is reduced. Under these conditions, the addition is made so that the monomers combine at the rate they are added. Refluxing is held down as much as possible. When the addition is rapid, i.e., from 2 to 5 hours, the mixture is held an additional 2 to 6 hours for complete reaction. During this period, the temperature is gradually raised to 400°–460° F. Finally, an inert gas blow is used to remove the last trace of free monomer. Interpolymerization may be carried out under an inert gas blanket, if desired.

It becomes convenient at this point to illustrate the process of manufacturing the modified alkyds of this invention. It is to be understood that these examples are for illustrative purposes only to acquaint those skilled with the art with the best mode known to the inventors for producing these materials. It is not intended that the scope of the invention shall be limited to the extent of the examples here given.

The quantities indicated for the various materials in the following examples are in terms of parts by weight unless otherwise indicated and all temperatures are in terms of degrees Fahrenheit.

The apparatus used in the following examples was either (1) a three necked round bottom flask or (2) a stainless steel kettle. The flask is equipped with an agitator (center neck), a blow tube for inert gas and a thermometer using one side neck, and a water separator and condenser in the other side neck during solvent reflux (this neck may be open or have an air condenser tube during the preparation of the alkyd by the fusion process prior to monomer addition). The monomer mixture is added dropwise from a separatory funnel using a Y tube to accommodate both the water separator and the funnel.

The flask used in the examples starting with 690 parts of linseed fatty acids was of 5 liter capacity.

The stainless steel kettle is similar except the top has four openings and a thermocouple replaces the thermometer. During solvent processing or monomer addition a gasket of inert material (Teflon, aluminum foil, wrapped asphalt, or asbestos, etc.), is placed between the kettle and the top. They are then held securely in place with C clamps. The examples using 2760 parts of linseed fatty acids were made in a 5 gallon stainless steel kettle.

EXAMPLE I

The following materials in the amounts indicated were reacted to produce a ternary monomer modified alkyd.

(1) Linseed oil fatty acids _____ 2760
(2) Pentaerythritol _____ 716
(3) Trimethylolethane _____ 840
(4) Phthalic anhydride _____ 2020
(5) Vinyl toluene _____ 1300
(6) Methyl methacrylate _____ 1300
(7) Acrylonitrile _____ 434
(8) Ditertiary butyl peroxide _____ 31.5

Materials 1 through 4 were admixed and placed under a carbon dioxide blanket and the batch heated to 440°. After 1½ hours the batch was cooled to 270°, and the carbon dioxide blow was cut off.

A mixture of 5, 6, 7 and 8 was added, slowly, the temperature being maintained at from 240° to 270°, the time of addition being 4 hours and 20 minutes. If there is any distillate recovered, the distillate is also returned to the reaction mass. The temperature was maintained at from 240° to 255° for a period of 5 hours, and thereafter the temperature was gradually increased until the cure of the resinous mass was reduced to about 10 seconds. In this particular case, the time required was about 3 hours and 30 minutes. Thereafter the reaction mass was cut to 50% solids with high flash naphtha and the mass strained. The base yield was 8,812 parts of a product having the following characteristics:

Viscosity (Gardner-Holdt) _____ U
Color (Gardner) _____ 6
Acid value _____ 22.1
Weight per gallon _____lbs__ 8.05
Final cure _____seconds__ 10

EXAMPLE II

In the previous Example I, the excess of hydroxyl over avaialble carboxyl was 10%. The present example illustrates a product produced from an alkyd having a 20% excess hydroxyl. The ingredients and proportions used in this example were the same as in Example I with the exception that instead of 716 parts of pentaerythritol, 780 were used, and instead of 840 parts of trimethylolethane, 912 parts were used. Monomer addition was begun as in Example I at a 35 second cure and a 17.8 acid value. The monomer addition required 3 hours.

The base yield was 8880 parts which were cut with a like weight of high flash naphtha. The product had the following characteristics:

Viscosity (Gardner-Holdt) _____ Y
Color (Gardner) _____ 6–7
Acid value _____ 13.4
Weight per gallon _____lbs__ 8.11
Final cure _____seconds__ 9

EXAMPLE III

The following materials in the amounts indicated were reacted to produce a ternary monomer modified alkyd:

(1) Linseed oil fatty acids _____ 2760
(2) Pentaerythritol _____ 716
(3) Trimethylolethane _____ 840
(4) Phthalic anhydride _____ 2020
(5) Vinyl toluene _____ 1733
(6) Methylmethacrylate _____ 867
(7) Acrylonitrile _____ 434
(8) Ditertiary butyl peroxide _____ 31.5

The procedure followed in this example was as given in Example I above.

The base yield was 8887 parts which were cut with 2962 parts of high flash naphtha. This product had the following characteristics:

| | |
|---|---|
| Viscosity _____minutes__ | 36.5 |
| Color (Gardner) _____ | 10–11 |
| Acid value _____ | 24.4 |
| Weight per gallon _____lbs__ | 8.61 |
| Final cure _____seconds__ | 12 |

EXAMPLE IV

In many of these examples, the weight of the monomer addition has been approximately 110% of the oil acid content of the reaction mass. This example illustrates a vehicle produced wherein the monomer addition amounts to about 90% of the oil acid content. The following materials in the amounts indicated were reacted to produce a ternary monomer modified alkyd:

| | |
|---|---|
| (1) Linseed oil fatty acids _____ | 2760 |
| (2) Pentaerythritol _____ | 716 |
| (3) Trimethylolethane _____ | 840 |
| (4) Phthalic anhydride _____ | 2020 |
| (5) Vinyl toluene _____ | 1175 |
| (6) Methylmethacrylate _____ | 1175 |
| (7) Acrylonitrile _____ | 261 |
| (8) Ditertiary butyl peroxide _____ | 26.5 |

The procedure in this case was as given in Example I. The monomers were added at a 46 second cure, the addition being made in 4 hours and 50 minutes.

The base yield was 8310 parts which were cut with 2770 parts of high flash naphtha. This product had the following characteristics:

| | |
|---|---|
| Viscosity _____minutes__ | 42 |
| Color (Gardner) _____ | 10–11 |
| Acid number _____ | 21.2 |
| Weight per gallon _____lbs__ | 8.67 |
| Final cure _____seconds__ | 11 |

EXAMPLE V

The following materials in the amounts indicated were reacted to produce a ternary monomer modified alkyd.

| | |
|---|---|
| (1) Linseed oil fatty acids _____ | 690 |
| (2) Pentaerythritol _____ | 179 |
| (3) Trimethylolethane _____ | 210 |
| (4) Phthalic anhydride _____ | 505 |
| (5) Vinyl toluene (#1) _____ | 23 |
| (6) Ditertiary butyl peroxide (#1) _____ | 3 |
| (7) Vinyl toluene (#2) _____ | 302 |
| (8) Ethyl acrylate _____ | 325 |
| (9) Acrylonitrile _____ | 108 |
| (10) Ditertiary butyl peroxide (#2) _____ | 8 |

The first four materials were admixed, placed under a $CO_2$ blanket and the temperature raised in 1.75 hours to 420° where it was held for approximately 3 hours. At this time, the heat was cut off and the batch allowed to cool over night. The next morning the temperature was raised to 270° and a mixture of 5 and 6 above was added. Immediately thereafter a mixture of 7, 8, 9 and 10 was added over a 3.5 hour period and the mass heated at 240–280° for 3.5 hours. At the end of this time, the cure was 17 seconds. Heating was continued for an additional 2 hours until the cure was reduced to 10 seconds, the reaction product then being cut and strained.

The base yield was 2185 parts which were cut with a like weight of high flash naphtha. This product had the following characteristics:

| | |
|---|---|
| Viscosity (Gardner-Holdt) _____ | T |
| Color (Gardner) _____ | 6–7 |
| Acid value _____ | 22.1 |
| Weight per gallon _____lbs__ | 8.07 |
| Final cure _____seconds__ | 10 |

EXAMPLE VI

Following exactly the same procedure as set forth in Example V above, the following materials in the amounts indicated were reacted to produce a ternary monomer modified alkyd:

| | |
|---|---|
| (1) Linseed oil fatty acids _____ | 690 |
| (2) Pentaerythritol _____ | 179 |
| (3) Trimethylolethane _____ | 210 |
| (4) Phthalic anhydride _____ | 505 |
| (5) Styrene (#1) _____ | 23 |
| (6) Ditertiary butyl peroxide (#1) _____ | 3 |
| (7) Styrene (#2) _____ | 302 |
| (8) Methylmethacrylate _____ | 325 |
| (9) Acrylonitrile _____ | 108 |
| (10) Ditertiary butyl peroxide (#2) _____ | 8 |

The addition time of the monomers in this case was 3 hours.

The base yield in this case was 2172 parts and was cut with a like weight of high flash naphtha. This product had the following characteristics:

| | |
|---|---|
| Viscosity (Gardner-Holdt) _____ | W |
| Color (Gardner) _____ | 7–8 |
| Acid value _____ | 19.4 |
| Weight per gallon _____lbs__ | 8.14 |
| Final cure _____seconds__ | 11 |

EXAMPLE VII

Instead of 690 parts of linseed oil fatty acids in the formulation set forth in Example V, this ingredient was replaced with a like weight of tall oil fatty acids. All other ingredients were the same and the procedure was the same as in Example II. The addition of the monomers took 2 hours and 50 minutes.

The base yield was 2241 parts which were cut with a like weight of high flash naphtha. This product had the following characteristics:

| | |
|---|---|
| Viscosity (Gardner-Holdt) _____ | Y |
| Color (Gardner) _____ | 4–5 |
| Acid value _____ | 21.3 |
| Weight per gallon _____lbs__ | 8.08 |
| Final cure _____seconds__ | 7 |

EXAMPLE VIII

The same ingredients used in Example V above were combined again in the same proportions with the exception that instead of ethylacrylate, ethylmethacrylate was used, the substitution being weight for weight. The addition of the monomers took 2 hours and 56 minutes.

The base yield was 2251 parts which were cut with a like weight of high flash naphtha. This product had the following characteristics:

| | |
|---|---|
| Viscosity (Gardner-Holdt) _____ | V |
| Color (Gardner) _____ | 6 |
| Acid number _____ | 22.4 |
| Weight per gallon _____lbs__ | 8.07 |
| Final cure _____seconds__ | 9 |

EXAMPLE IX

The following materials in the amounts indicated were reacted to produce a ternary monomer modified alkyd:

| | |
|---|---|
| (1) Linseed oil fatty acids _____ | 2760 |
| (2) Pentaerythritol _____ | 716 |
| (3) Trimethylolethane _____ | 840 |
| (4) Phthalic anhydride _____ | 2020 |
| (5) Vinyl toluene (#1) _____ | 82 |
| (6) Ditertiary butyl peroxide (#1) _____ | 15 |
| (7) Vinyl toluene (#2) _____ | 1208 |
| (8) Methylmethacrylate _____ | 1156 |
| (9) Acrylonitrile _____ | 578 |
| (10) Ditertiary butyl peroxide _____ | 29 |

The foregoing materials were reacted in the same manner as in Example V above, this example illustrating a different proportion of the monomers. Here the vinyl toluene is to the methylmethacrylate is to the acrylonitrile as 45:40:15.

The monomer addition was begun at a cure of 49 seconds and occupied an addition time of 3 hours. The base yield was 8879 parts which were cut with a like weight of high flash naphtha. This product had the following characteristics:

| | |
|---|---|
| Viscosity (Gardner-Holdt) | X–Y |
| Color (Gardner) | 8 |
| Acid value | 25 |
| Weight per gallon lbs | 8.14 |
| Final cure seconds | 11 |

EXAMPLE X

The following materials in the amounts indicated were reacted to produce a ternary monomer modified alkyd:

(1) Linseed fatty acids _____ 690
(2) Pentaerythritol _____ 179
(3) Trimethylolethane _____ 210
(4) Phthalic anhydride _____ 505
(5) Vinyl toluene _____ 325
(6) Methyl acrylate _____ 325
(7) Acrylonitrile _____ 108
(8) Ditertiary butyl peroxide _____ 11

The procedure followed in this example was about the same as in the previous two examples. The first four materials were started under a carbon dioxide blanket and the temperature raised to 420° F. The reaction mass was held for a 52 second cure and then cooled to 270°. The carbon dioxide was turned off. A blend of materials 5, 6, 7 and 8 was then added, taking 3 hours for the entire addition. The heat was allowed to fade to about 235° F. during the reaction. It is desirable not to allow the reflux to become too vigorous. When the addition is complete, the reaction mass is held at the same temperature for about 1 hour. At this point it is gradually allowed to rise to 440°, the rate of reflux governing the rate of increase. At a 10 second cure, the mass is thinned and strained.

The base yield in the present case was 2045, the mass being cut with high flash naphtha of equal weight. The product had the following characteristics:

| | |
|---|---|
| Viscosity (Gardner-Holdt) | U |
| Color (Gardner) | 4–5 |
| Acid value | 25.1 |
| Weight per gallon lbs | 8.08 |
| Final cure seconds | 10 |

EXAMPLE XI

The following materials in the amounts indicated were reacted to produce a ternary monomer modified alkyds:

(1) Linseed fatty acids _____ 2760
(2) Pentaerythritol _____ 716
(3) Glycerine _____ 645
(4) Phthalic anhydride _____ 2020
(5) Vinyl toluene (#1) _____ 92
(6) Ditertiary butyl peroxide (#1) _____ 15
(7) Vinyl toluene (#2) _____ 1208
(8) Methylmethacrylate _____ 1300
(9) Acrylonitrile _____ 434
(10) Ditertiary butyl peroxide (#2) _____ 29

The procedure followed in this case was as given in Example V for the initial peroxide catalyst introduction. The list of ingredients differs from that given in Example I by the substitution of 645 parts of glycerine in place of the 840 parts of trimethylolethane.

When the cure in the alkyd reaction had reached 40 seconds, monomer additions were begun and required 2 hours and 57 minutes.

The base yield was 8648 parts which were cut with 9127 parts of high flash naphtha. The product had the following characteristics:

| | |
|---|---|
| Viscosity (Gardner-Holdt) | V+ |
| Color (Gardner) | 7–8 |
| Acid value | 23.6 |
| Weight per gallon lbs | 8.12 |
| Final cure seconds | 13 |

EXAMPLE XII

The following materials in the amounts indicated were reacted to produce a ternary monomer modified alkyd:

(1) Linseed oil fatty acids _____ 690
(2) Pentaerythritol _____ 179
(3) Trimethylolethane _____ 210
(4) Phthalic anhydride _____ 455
(5) Benzoic acid _____ 83
(6) Vinyl toluene _____ 325
(7) Methyl acrylate _____ 325
(8) Acrylonitrile _____ 108
(9) Ditertiary butyl peroxide _____ 7.6

The procedure followed in this example was as given in Example X above, the difference between the two examples residing in the reduction in the amount of phthalic anhydride and the replacement of part thereof with benzoic acid, a monobasic aromatic acid. The alkyd reaction was carried to a 37 second cure, and the monomer addition required 3 hours and 25 minutes.

The base yield was 2226 parts which were cut with 742 parts of high flash naphtha. This product had the following characteristics:

| | |
|---|---|
| Viscosity | 4 minutes, 25 seconds. |
| Color (Gardner) | 7–8. |
| Acid value | 10.9 |
| Weight per gallon | 8.50 lbs. |
| Final cure | 10 seconds. |

EXAMPLE XIII

The following materials in the amounts indicated were reacted to produce a ternary monomer modified alkyd:

(1) Linseed fatty acids _____ 2760
(2) Glycerine _____ 1290
(3) Phthalic anhydride _____ 2020
(4) Ditertiary butyl peroxide _____ 12
(5) Vinyl toluene _____ 92
(6) Vinyl toluene _____ 1208
(7) Methyl methacrylate _____ 1300
(8) Acrylonitrile _____ 434
(9) Ditertiary butyl peroxide _____ 32

These materials were reacted together following the same procedure as set forth in Example V above. In this particular case glycerine is used as the only polyol and monomer addition is begun at a higher cure, i.e., 59 seconds. The esterification reaction required about 7 hours. Materials 4 and 5 were then blended and added to the reaction mass. Thereafter, a mixture of 6, 7, 8 and 9 was gradually added to the mass, the addition requiring about 7 hours. The material was then carried to a 10 second cure.

The base yield was 8493 and the material was cut to 50% solids with high flash naphtha. The characteristics of the product were as follows:

| | |
|---|---|
| Viscosity (Gardner-Holdt) | U |
| Color (Gardner) | 9 |
| Acid value | 9.6 |
| Weight per gallon lbs | 8.16 |
| Final cure seconds | 9 |

EXAMPLE XIV

The following materials in the amounts indicated were reacted to produce a ternary monomer modified alkyd:

(1) Linseed fatty acids _____ 690
(2) Pentaerythritol _____ 140
(3) Trimethylolethane _____ 265
(4) Phthalic anhydride _____ 505
(5) Vinyl toluene _____ 230
(6) Methyl methacrylate _____ 459
(7) Acrylonitrile _____ 77
(8) Ditertiary butyl peroxide _____ 7.9

These materials were reacted in substantially the same manner as set forth in Example I. The esterification was carried on at about 440°, and the addition of monomers was carried out at about 300°. The monomer addition required a period of about 4 hours. The temperature dropped to about 256° due to violent reflux and was raised to 350° slowly. Some foaming was observed. The reaction was cooked to a cure of about 12 seconds and then cut and strained.

The base yield in the present example was 2239 and was cut to 75% solids in high flash naphtha. This product had the following characteristics:

Acid value _____ 21.1
Final cure _____seconds__ 10

EXAMPLE XV

In this example the alkyd resin was made separately. The alkyd comprised a linoleic-oleic fatty acid mixture (60:40), pentaerythritol, phthalic anhydride and crotonic acid.

(1) Linoleic-oleic fatty acids (60:40) _____ 4140
(2) Pentaerythritol _____ 1842
(3) Phthalic anhydride _____ 1576
(4) Crotonic acid _____ 1065

All of the reactants were heated to 300° in 30 minutes, where the temperature was held for 15 minutes. The temperature was then increased to 350° and held for 50 minutes. It was again increased to 400° and held for 50 minutes and finally increased to 450° and held until an acid value of 10 was obtained.

The base yield of alkyd was 7650 and it was cut to 66.6% solids with high flash naphtha. This product had the following characteristics:

Viscosity (Gardner-Holdt) _____ J–K
Color _____ 7+
Acid value _____ 11.3
Final cure _____seconds__ 98

Equal parts of the foregoing alkyd and xylene (540 parts of each) were admixed and the temperature raised to 290°. A mixture of 270 parts of vinyl toluene, 45 parts of methylmethacrylate, 45 parts of acrylonitrile and 9 parts of ditertiary butyl peroxide was added. The temperature was maintained between 280° and 290° and the addition required a period of 4 hours. The reaction mass was held at this temperature until a 10 to 12 second cure was obtained.

This product had the following characteristics:

Viscosity _____ J+
Color (Gardner) _____ 8
Acid value _____ 4.9
Weight per gallon _____lbs__ 7.96
Final cure _____seconds__ 12

EXAMPLE XVI

The previous examples have illustrated a preferred method of forming the interpolymers of this invention, that is, by first forming the alkyd and subsequently modifying the alkyd with the monomers. As indicated above, the monomer modification may take place before alkyd formation in accordance with the following procedure:

(1) Linseed fatty acid _____ 690
(2) Vinyl toluene _____ 325
(3) Methyl methacrylate _____ 325
(4) Acrylonitrile _____ 108
(5) Ditertiary butyl peroxide _____ 11
(6) Pentaerythritol _____ 179
(7) Trimethylolethane _____ 210
(8) Phthalic anhydride _____ 505

The fatty acids were heated to a temperature of 300° F. under a $CO_2$ blanket, the heat occupying a time of 30 minutes. The three monomers and the catalysts in admixture were then added over a period of 3 hours, the temperature falling to about 240° F. Heat was then applied to the reaction mass to gain 400° F. slowly, this operation taking 3 hours. Thereafter the polyols and the dibasic acid were added in a period of 5 minutes and the temperature increased to 440° F. This occupied a period of about 40 minutes. The temperature was held at 440 until a cure of 10 seconds was obtained. The time for reaching this cure was 3 hours and 45 minutes. The product was then cut with high flash naphtha with 50% solids as in the previous examples.

The base yield was 2190 parts which were cut with a like weight of high flash naphtha. This product had the following characteristics:

Viscosity (Gardner-Holdt) _____ $Z_1$
Color (G) _____ 5–6
Acid value _____ 19.5
Weight per gallon _____lbs__ 8.07
Final cure _____seconds__ 9

Generally, the ternary monomer modified alkyds hereof in solution in mineral spirits, Hi-Flash naphtha, xylol, etc. to the extent of 40% to 80% solids have viscosities ranging from F–$Z_5$ on the Gardner-Holdt scale, and higher, e.g., at 80% solids viscosities of 20–50 minutes are not unusual.

Generally, as the percentage of vinyl cyanide is increased in the modified alkyds hereof, there is a tendency to reduced compatibility in the mineral spirits type thinners.

The colors are preferably below 15, usually in the range of 4–9 Gardner. The acid value is preferably under about 40 and the final cure under about 20 seconds.

The products show fairly good compatibility with alkyds not modified with monomers as well as with alkyds modified with one or two of the monomers above mentioned.. For example, the product of Example I is compatible in a ratio of 1 part Example I to 1 part of each of alkyds (4), (5), (6) and (7) in Table II. It is compatible with 4 parts of alkyd (3) in Table II.

Although these products have particular adaptability as automotive refinishing vehicles, which are primarily air dried coatings, they have been demonstrated to be very satisfactory in automotive production baking finishes, with or without urea or melamine-aldehyde resins such as, for example, melamine-formaldehyde, buylated melamine-formaldehyde resins, urea-formaldehyde and the like. These materials are also useful as vehicles for other industrial finishing purposes involving both air drying and baking. A satisfactory baking schedule for formulations including these resins is 30 minutes at 200° F. or 10 minutes at 300° F., or any suitable intermediate schedule.

Thus, these materials are useful not only in automotive enamel formulations but also as clear vehicles, or varnishes and industrial metal finishing formulations, e.g., business machines, transportation finishes and the like.

As an example of the commercial importance of the compositions of this invention, a standard formulation utilizing the vehicle of Example I was prepared according to the following formula:

RED ENAMEL

| | Wt. (grams) | Percent |
|---|---|---|
| Pigment 7.7%: | | |
| Dark toluidine red | 402 | 81.70 |
| Indanthrene maroon | 11.5 | 2.33 |
| Rutile titanium dioxide | 78.5 | 15.97 |
| Total pigment | 492.0 | 100.00 |
| Vehicle 92.3%: | | |
| Alkyd of Example I (introduced at 50% solids in high-flash naphtha) | 4895.0 | 82.96 |
| Soya lecithin | 0.2 | trace |
| Xylene | 1,004.8 | 17.03 |
| Total vehicle | 5,900.0 | 100.00 |
| Total weight | 6,392.0 | |
| Resin solids, 38.3%. | | |
| Total solids, 46.0%. | | |

A test was performed in an automotive re-painting shop regularly engaged in the business of refinishing automobiles. A 1953 Mercury was wet sanded with grease and oil remover and No. 320 sandpaper. No primer surfacer or sealer was used. The enamel was reduced 50% with a reducer having the following formula:

45% lacquer diluent naphtha
55% toluol

For spray application, coatings formulated with these vehicles desirably utilize a reducer of the type mentioned above. The car was sprayed in an open booth with the exhaust fan inoperative. The gun employed was a Binks No. 7 with fluid and atomizing air adjustment screws wide open. Atomizing pressure at the gun was 40 lbs. per square inch. The entire finishing procedure consumed 14 minutes and was as follows:

(1) Left side top
(2) Right side top
(3) Right front door
(4) Right side of hood
(5) Left side of hood
(6) Right front fender—1 coat At this point, 5 minutes' spraying time had elapsed and the first cup of reduced enamel was exhausted. Straining the paint and re-filling the cup consumed 2 minutes The finishing procedure continued as follows:

(7) Right front fender—2nd coat
(8) Left front fender
(9) Left front door
(10) Left rear fender and quarter
(11) Left half deck lid
(12) Right half deck lid
(13) Right rear fender and quarter with resultant tie-up to previous work The overspray from the left passes of the gun carried 8 to 10 inches into the original starting point. The overspray laid on the surface in the form of dust for 10 to 20 seconds and then completely disappeared into the film. It was imposible to discern where the job started or finished. The total time including straining and re-loading was 14 minutes and there was no evidence of running or sagging. This test car could have been delivered to a potential customer 34 minutes after the painter finished, or 50 minutes from the time the job was started. The gloss was full and the film substantially free of any dirt. After overnight drying there was no evidence of sand scratches or shrinking.

Only two quarts of reduced enamel were required.

The comparison of the procedure possible for automotive repainting utilizing the vehicles of the present invention with the schedule recommended for currently available refinishing materials is about as follows:

| Standard Available Material | New Formulation |
|---|---|
| 20 min. application 1st coat. 20 min. drying time between coats 10 min. tacking time. 20 min. application 2nd coat. 20 min. application solvent flow coat. 45 min. required drying time. | 20 min. application. 2 coats by panel method. 50 min. required drying time. |
| 2 hrs.—15 min. total. | 1 hr.—10 min. total. |

Not only is the refinishing time practically halved by changing the vehicle from a binary monomer modified alkyd resin (styrene-acrylonitrile linseed glyceryl phthalate) to a ternary modified alkyd resin, but the handling or feel to the operator is better and overspray is no longer a problem.

Improvement of corresponding scope is observed upon comparison with single monomer modified alkyds (styrenated oil modified alkyds) and oil modified alkyds which have not been further modified with a polymerizable monomer. Other tests under conditions normally occurring and normally yielding wrinkling failed to develop a wrinkle in the film sprayed on a primed metal panel.

Formulation into automotive paints follows standard procedure known to those skilled in this art. These vehicles may also be used in the production of finishes for metal of the baking or air drying types again following standard formulation techniques for these industrial finishes.

Further examples illustrating the mode of using the vehicles of this invention include the following automotive enamel formulations:

BLUE ENAMEL

| | Wt. (grams) | Percent |
|---|---|---|
| Pigment 3.4%: | | |
| Neutral lampblack | 9.6 | 6.7 |
| Phthalocyanine blue | 21.3 | 14.8 |
| Rutile titanium dioxide | 53.8 | 37.4 |
| Non-leaf aluminum paste | 55.5 | 38.7 |
| Indanthrene blue | 3.5 | 2.4 |
| Total pigment | 143.7 | 100.0 |
| Vehicle 96.6%: | | |
| Alkyd of Example I (introduced at 50% solids in high-flash naphtha) | 3,771.2 | [1] 45.8 / [2] 45.8 |
| Soya lecithin | 0.1 | Trace (0.002) |
| Xylene | 345.0 | 8.38 |
| Total vehicle | 4,116.3 | 100.00 |
| Total weight | 4,260.0 | |
| Resin solids, 44.2%. | | |
| Total solids, 47.6%. | | |

[1] Alkyd solids.
[2] High flash naphtha.

GREEN ENAMEL

| | Wt. (grams) | Percent |
|---|---|---|
| Pigment 11.9%: | | |
| Rutile titanium dioxide | 105 | 98.0 |
| Phthalocyanine green | 0.72 | 0.7 |
| Green gold (YT 562-D) toner (Du Pont) | 1.4 | 1.3 |
| | 107.12 | 100.0 |
| Vehicle 88.1%: | | |
| Alkyd of Example XIII (introduced at 50% solids in high-flash naphtha) | 712.42 | 89.74 |
| Soya lecithin | 0.1 | 0.01 |
| Xylene | 81.36 | 10.25 |
| Total vehicle | 793.88 | 100.00 |
| Total weight | 901.00 | |
| Resin solids, 39.5%. | | |
| Total solids, 51.4%. | | |

The reducers which are useful in coating the enamels to sprayable consistency are mixtures of aliphatic and aromatic hydrocarbons with or without monohydric alcohols such as ethanol, propanol, isopropanol, normal-, secondary-, or iso-butanol. Specific examples include the following:

(a) 45% V.M. & P. naphtha
    55% xylol
(b) 35% lacquer diluent naphtha
    55% toluol
    10% ethanol Drier compositions may also be included in these enamels, for example, 1 to 2% zirconium octoate (6% metal) drier with or without 0.01% to 0.1% cobalt naphthenate and 0.02 to 0.2% manganese naphthenate. Driers are not necessary in these compositions although they may be used if desired.

Other modes of applying the principle of this invention may be employed instead of those specifically set forth above, changes being made as regards the details herein disclosed, provided the elements set forth in any of the following claims, or the equivalent of such be employed.

It is, therefore, particularly pointed out and distinctly claimed as the invention:

1. A composition of matter comprising the reaction product produced by heating at a temperature in the range of from about 240° F. to about 460° F. in the presence of a catalyst, (I) an oil modified alkyd prepared by reacting a polycarboxylic acid, an aliphatic monocarboxylic material selected from the group consisting of the acids of drying oils, the acids of semi-drying oils and mixtures of such acids and drying oils, semi-drying oils and mixtures thereof, and a saturated aliphatic polyhydric alcohol, said alkyd having an oil length of from 33% to 85%, an acid value of less than about 40, and an excess of hydroxyl ranging up to about 50% over that theoretically required to react with the carboxyl content; and, (II) a monomer composition prepared by admixing: (a) from about 10% to about 85% by weight of said monomer composition of a polymerizable monomeric monovinyl aromatic compound; (b) from about 5% to about 85% by weight of said monomer composition of a polymerizable monomeric ester of an unsaturated aliphatic acid having the formula:

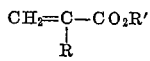

wherein R is selected from the group consisting of hydrogen and alkyl radicles of from 1 to 4 carbon atoms and R' is an alkyl radicle of from 1 to 8 carbon atoms, and (c) from about 10% to about 50% by weight of said monomer composition of a monomeric nitrile selected from the group consisting of acrylonitrile, methacrylonitrile and ethacrylonitrile; the amount of monomer composition by weight used to modify said alkyd being from about 0.5 to about 2 times the weight of the oil acid component present in said alkyd.

2. A composition in accordance with claim 1 in which II (A) is a monovinyl aromatic hydrocarbon.

3. A composition in accordance with claim 1 in which II(a) is vinyl toluene.

4. A composition in accordance with claim 1 in which II(a) is styrene.

5. A composition in accordance with claim 1 in which II(b) is an alkyl methacrylate.

6. A composition in accordance with claim 1 in which II(b) is methylmethacrylate.

7. A composition in accordance with claim 1 in which II(b) is an alkyl acrylate.

8. A composition in accordance with claim 1 in which II(b) is ethyl acrylate.

9. A composition in accordance with claim 1 in which II(c) is acrylonitrile.

10. A composition in accordance with claim 1 in which II(a) is vinyl toluene, II(b) is methyl methacrylate and II(c) is acrylonitrile.

11. A composition in accordance with claim 1 in which I is a linseed fatty acid pentaerythritol-trimethylolethane (1:1) phthalate, II(a) is vinyl toluene, II(b) is methylmethacrylate and II(c) is acrylonitrile.

12. A composition of matter comprising the reaction product produced by heating at a temperature in the range of from about 240° F. to about 460° F. in the presence of ditertiary butyl peroxide, (I) an oil modified alkyd prepared by reacting 2020 weight parts of phthalic anhydride, 2760 weight parts of linseed oil fatty acids, 716 weight parts of pentaerythritol and 840 parts of trimethylolethane, said alkyd having an oil length of from 33% to 85%, an acid value of less than about 40, and an excess of hydroxyl ranging up to about 50% over that theoretically required to react with the carboxyl content; and (II) a monomer composition prepared by admixing (a) 1300 weight parts of vinyl toluene, (b) 1300 weight parts of methylemethacrylate and (c) 434 weight parts of acrylonitrile; the amount of monomer composition by weight used to modify said alkyd being from about 0.5 to two times the weight of the oil fatty acid component present in said alkyd.

13. A composition in accordance with claim 1 in which I is a soya fatty acid-pentaerythritol-trimethylolethane (1:1) phthalate, II(a) is a vinyl toluene, II(b) is methylmethacrylate and II(c) is acrylonitrile.

14. A composition of matter comprising the reaction product produced by heating at a temperature of from about 240° F. to about 460° F., in the presence of ditertiary butyl peroxide as a catalyst, (I) an oil modified alkyd prepared by reacting phthalic anhydride, soya fatty acids, pentaerythritol, trimethylolethane, said alkyd having an oil length of from 33% to 85%, an acid value of less than about 40, and an excess of hydroxyl ranging up to about 50% over that theoretically required to react with the carboxyl content; and (II) a monomer composition prepared by admixing: (a) from about 10% to about 85% by weight of vinyl toluene, (b) from about 5% to about 85% by weight of methyl methacrylate, (c) from about 10% to about 50% by weight of acrylonitrile; the amount of monomer composition by weight used to modify said alkyd being from about 0.5 to about two times the weight of the soya fatty acids present in said alkyd.

15. A composition in accordance with claim 1 in which II(a) is alpha methyl styrene.

16. A composition is accordance with claim 1 in which II(a) is a mixture of alpha methyl styrene and vinyl toluene.

References Cited in the file of this patent
UNITED STATES PATENTS 2,600,623    Daniel    June 17, 1952
2,686,765    Arvin    Aug. 17, 1954

FOREIGN PATENTS 744,273    Great Britain    Feb. 1, 1956